United States Patent Office.

HENRY V. EDMOND, OF NORWICH, CONNECTICUT.

Letters Patent No. 92,292, dated July 6, 1869.

---

IMPROVED COMPOSITION FOR STAINING GLASS.

---

The Schedule referred to in these Letters Patent and making part of the same.

---

*To whom it may concern:*

Be it known that I, HENRY V. EDMOND, of Norwich, in the county of New London, and State of Connecticut, have invented a new and useful Improvement, being a new Composition for Staining Glass, which I denominate "Edmond's Glassaline;" and I do hereby declare the following to be a full, clear, and exact description of said composition, and the method of compounding and using the same.

My invention relates to the production of and method of using a brilliant, transparent preparation for staining glass of any color, which can be applied with little trouble, and the same beautiful effect obtained as that of expensive colored glasses; and It consists—

First, in the employment of a preparation consisting of gelatine, glycerine, aniline or coal-oil dye, or any other suitable color, and water, compounded, as will be hereinafter described; and Secondly, in the method or process by which this compound is applied to the surface of glass, so as to produce a new article of manufacture, called glassaline, or stained glass.

To produce a given quantity of the compound to be used for staining glass of any color, say, one-half (½) pint, the following proportions of the ingredients are used:

One-half pint of water.
Two and one-half drachms of gelatine.
One-half ounce of glycerine.
One ounce of aniline color, or coal-oil dye.

The process of compounding these articles is to heat the water to almost boiling-point; then add the gelatine, and stir until entirely dissolved. The glycerine is then added, and the three articles well mixed. The aniline or coloring-matter is then added, the mixture again well stirred, and the compound made, in a liquid form.

The use of gelatine is to form a base to the liquid, and to render the latter adhesive to the surface of the glass, while the glycerine gives body, prevents the gelatine from cracking on the glass after the mixture is applied, and makes it flow smoothly, producing an even, smooth surface.

This compound is a purely transparent preparation, because its base, gelatine, is transparent, and the other component parts are also transparent, while the coloring-matter simply varies the tint or shade.

When the compound is cold and ready for use, it is of a semi-solid form, like jelly; and to apply it to the surface of the glass, the article in which it is contained, such as a bottle, must be immersed in hot water, or heated upon a stove; and by a few moments application of such heat, the compound fuses and becomes liquid.

In this condition it is applied to the surface of the glass to be stained, by flowing it on when the glass is in a horizontal position, a brush being used to spread it equally and evenly over the entire surface of the glass.

The compound thus applied, will set or become fixed to the surface of the glass in about ten minutes, and as the water evaporates, will dry perfectly hard and transparent; after which its surface may be protected by a coat of white copal, or other transparent varnish, for the purpose of allowing it to be washed with soap and water without injury, and to shield it from the action of the weather.

The preparation, thus compounded, may be applied to the glass of a sash already in use, by placing the latter in a horizontal position, and pouring the glassaline or compound in the centre of the pane, on the inside of the sash, and with a small brush assist it to flow equally over the surface of each pane.

After coloring all the glass in the sash, the latter remains in its horizontal position until the glassaline sets. The sash may then be put in position, and the glassaline will dry perfectly hard and transparent; after which a thin coat of any white transparent varnish is applied, as before described.

In this way stained or colored glass, of blue, scarlet, green, magenta, yellow, violet, solferino, purple, crimson, or any other desired color, may be produced at less than one-twentieth the cost of the article as produced by the process heretofore in use, and will be as perfect an imitation of stained glass as can be produced by surface-coloring.

The tint or shade of the color may be lighter or darker, by using a greater or less quantity of the compound. Two or three tablespoonfuls of the latter are sufficient to color a pane eight by twelve.

Each pane of glass can be ornamented with any device, by making separating walls of suitable material, with which to enclose the compound, which walls are insoluble by contact with said compound, and the different figures or ornamentations may be set in the same or different shades or colors, in the several panes of glass.

Having thus described my invention,

I claim—

1. The compound or preparation hereinbefore described, for coloring or staining glass.

2. The use of gelatine as the base, in combination with aniline or coal-oil dye, in the production of a compound for coloring or staining glass, substantially as described.

3. The employment of glycerine, in combination with gelatine and aniline, or any kind of color, in a liquid form, in the production of stained or colored glass, substantially as described.

4. Stained or colored glass, produced as hereinbefore described, as a new article of manufacture.

In testimony whereof, I have hereunto signed my name.

HENRY V. EDMOND.

Witnesses:
NATHAN PRICE,
CHAS. B. WARE.